United States Patent
Berba et al.

(10) Patent No.: US 11,039,291 B2
(45) Date of Patent: *Jun. 15, 2021

(54) POLICY NODE IDENTIFIER FOR APPLICATION SERVICES IN A PACKET CORE NETWORK

(71) Applicant: AT&T Intellectual Property I, L.P., Atlanta, GA (US)

(72) Inventors: Lea Berba, Sammamish, WA (US); Srikanth Tirumala, Redmond, WA (US); Jiansong Wang, Lincroft, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,718

(22) Filed: Aug. 12, 2020

(65) Prior Publication Data
US 2020/0374676 A1    Nov. 26, 2020

Related U.S. Application Data

(63) Continuation of application No. 16/377,059, filed on Apr. 5, 2019, now Pat. No. 10,785,622.

(51) Int. Cl.
*H04M 3/42*        (2006.01)
*H04W 4/50*        (2018.01)
(Continued)

(52) U.S. Cl.
CPC ............. *H04W 4/50* (2018.02); *H04L 67/327* (2013.01); *H04W 8/20* (2013.01)

(58) Field of Classification Search
CPC ........... H04W 4/02; H04W 4/16; H04W 8/18; H04W 8/26; H04W 48/16; H04W 48/18;
(Continued)

(56) References Cited

U.S. PATENT DOCUMENTS 7,856,530 B1   12/2010  Mu
8,144,591 B2    3/2012  Ghai et al.
(Continued)

FOREIGN PATENT DOCUMENTS

CN       106792613 A    5/2017
WO    2009094837 A1    8/2009
(Continued)

OTHER PUBLICATIONS

Jouihri et al., "Network Function Virtualization: Mitigating the Impact of VoLTE on the Policy and the Charging System", Journal of Telecommunications and Information Technology, 2016, pp. 66-76.
(Continued)

*Primary Examiner* — Temica M Beamer
(74) *Attorney, Agent, or Firm* — Amin, Turocy & Watson, LLP

(57) ABSTRACT

Node identifiers can be assigned to packet core policy nodes and directly routed to a diameter routing agent (DRA) and application functions (AFs) within a call processing message that is employed to establish an application service. Such a policy node identity will be received by Application Functions, UEs and/or intermediate message routers during the initial establishment of a packet data session so that they can refer to the policy node entity directly in the sub-sequent call processing flows related the established session, instead of querying a relational database which can be complex to maintain with multi-million correlation records. As an example, the policy node identifiers can be configurable and can comprise a hostname of the policy nodes, address data associated with the policy nodes, or a defined numerical value that maps to the hostname of the policy nodes.

20 Claims, 14 Drawing Sheets

(51) Int. Cl.
*H04L 29/08* (2006.01)
*H04W 8/20* (2009.01)

(58) Field of Classification Search
CPC ..... H04W 88/06; H04W 60/00; H04W 36/14; H04W 72/02; H04W 76/02; H04W 28/16; H04W 92/02
USPC ................ 455/414.1, 435.2, 445, 450, 452.1
See application file for complete search history.

(56) References Cited

U.S. PATENT DOCUMENTS

| | | | |
|---|---|---|---|
| 8,615,237 | B2 | 12/2013 | Baniel et al. |
| 8,918,469 | B2 | 12/2014 | Sprague et al. |
| 9,237,595 | B2 | 1/2016 | Abou-Assali et al. |
| 9,319,378 | B2 | 4/2016 | Mccann |
| 9,661,151 | B2 | 5/2017 | Li et al. |
| 9,699,076 | B2 | 7/2017 | Renzullo et al. |
| 9,730,095 | B2 | 8/2017 | Ophir |
| 9,800,504 | B2 | 10/2017 | Renzullo et al. |
| 2009/0318147 | A1 | 12/2009 | Zhang et al. |
| 2014/0086052 | A1 | 3/2014 | Cai et al. |
| 2017/0163432 | A1 | 6/2017 | Castro Castro et al. |
| 2017/0237781 | A1 | 8/2017 | Butala et al. |
| 2018/0309800 | A1 | 10/2018 | Aravamudhan et al. |
| 2019/0020722 | A1 | 1/2019 | Haraszti et al. |
| 2019/0357288 | A1 | 11/2019 | Palanisamy et al. |

FOREIGN PATENT DOCUMENTS

| | | |
|---|---|---|
| WO | 2013060133 A1 | 5/2013 |
| WO | 2016074224 A1 | 5/2016 |
| WO | 2016119433 A1 | 8/2016 |
| WO | 2017078794 A1 | 5/2017 |

OTHER PUBLICATIONS

Ito et al., "Service-Specific Network Virtualization to Reduce Signaling Processing Loads in EPC/IMS", IEEE Access 2, DOI:10.1109/ACCESS.2014.2359059, vol. 2, 2014, pp. 1076-1084.

Non-Final Office Action received for U.S. Appl. No. 16/377,059 dated Feb. 7, 2020, 20 pages.

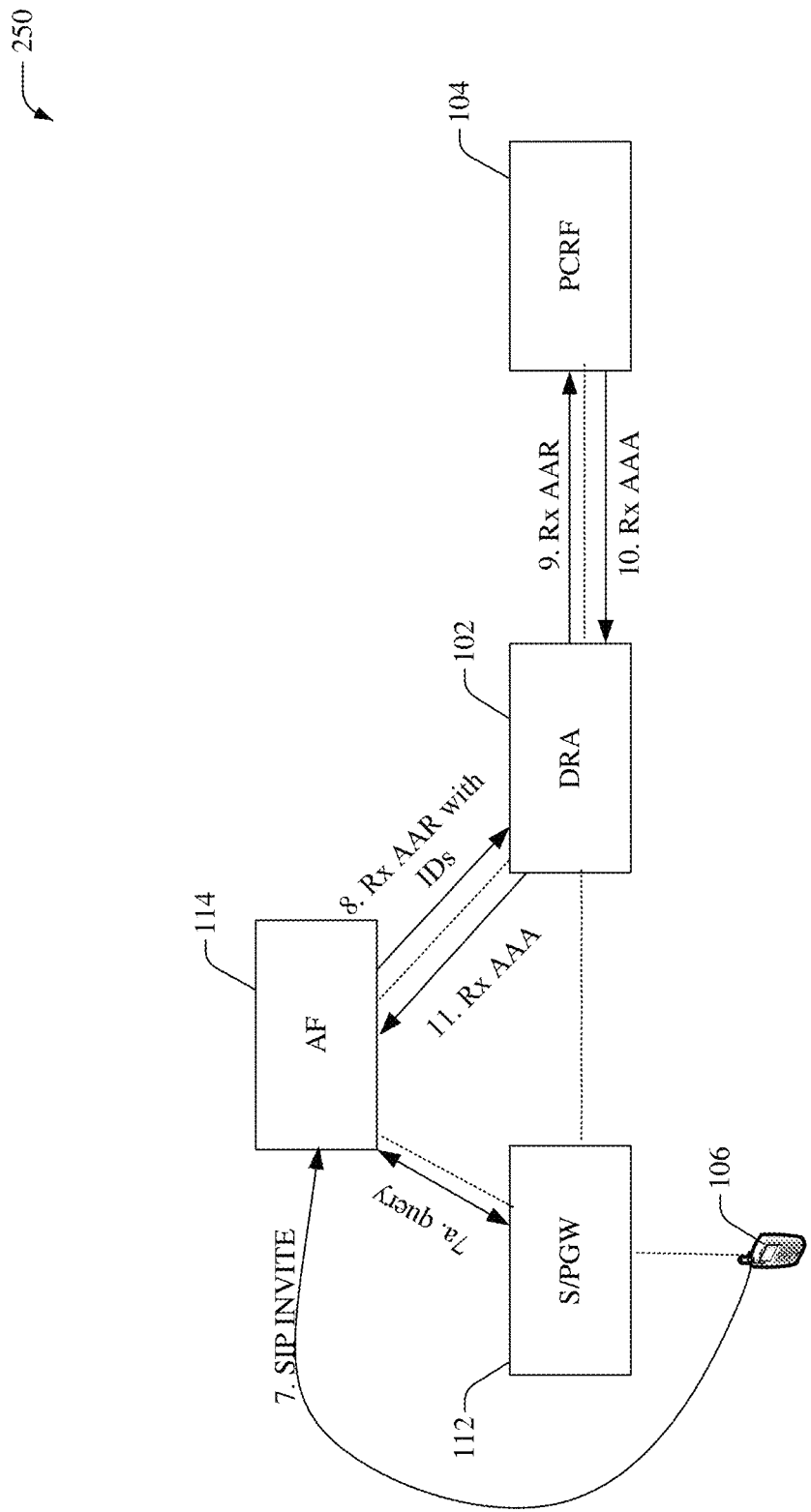

POLICY NODE IDENTIFIER FOR APPLICATION SERVICES IN A PACKET CORE NETWORK

RELATED APPLICATION

The subject patent application is a continuation of, and claims priority to, U.S. patent application Ser. No. 16/377,059 (now U.S. Pat. No. 10,785,622), filed Apr. 5, 2019, and entitled "POLICY NODE IDENTIFIER FOR APPLICATION SERVICES IN A PACKET CORE NETWORK," the entirety of which application is hereby incorporated by reference herein.

TECHNICAL FIELD

The subject disclosure relates to wireless communications, e.g., policy node identifier utilized for application services in a packet core network.

BACKGROUND

Long Term Evolution (LTE) networks support a large number of application services (e.g. voice over LTE (VoLTE), video streaming and/or download services, content delivery services, etc.) and will continue to add new revenue-generating services (e.g. dynamic traffic management). With mobile data and voice traffic growing exponentially, service reliability has become a crucial factor for the LTE network. Moreover, it is important that services are delivered seamlessly, and service disruptions are avoided.

In conventional systems, when a user equipment (UE) attaches to an LTE network and initiates application service, several packet core nodes are employed in the call flow for service delivery, such as, a mobility management entity (MME), a serving and packet gateway (S/PGW), a diameter routing agent (DRA), a policy and charging rules function (PCRF) and an application function (AF). During a UE attach procedure, the MME sends a Create Session Request to the S/PGW, which then sends a Credit Control Request (CCR-I) to the PCRF via the DRA. The PCRF responds to S/PGW with a Credit Control Answer (CCA-I) and the S/PGW then sends Create Session Response to the MME. Traditionally, the DRA stores the PCRF routing information per Internet protocol-connectivity access network (IP-CAN) session in a binding database. This routing information is critical for delivering application services. For application services to be established, an Rx message comprising an identifier of the UE is sent from the AF to the DRA. The DRA can then determine the PCRF hosting the IP-CAN session by querying the binding database.

Typically, the binding database comprises millions of records. Management and maintenance of such a large number of records can be complex. Further, unavailability of this binding database can directly impact application services and result in substantial revenue loss.

BRIEF DESCRIPTION OF THE DRAWINGS

FIGS. 2A-2D illustrate an example message sequence flow chart that deploys a policy node identifier in packet core network devices.

DETAILED DESCRIPTION

Figure 1:
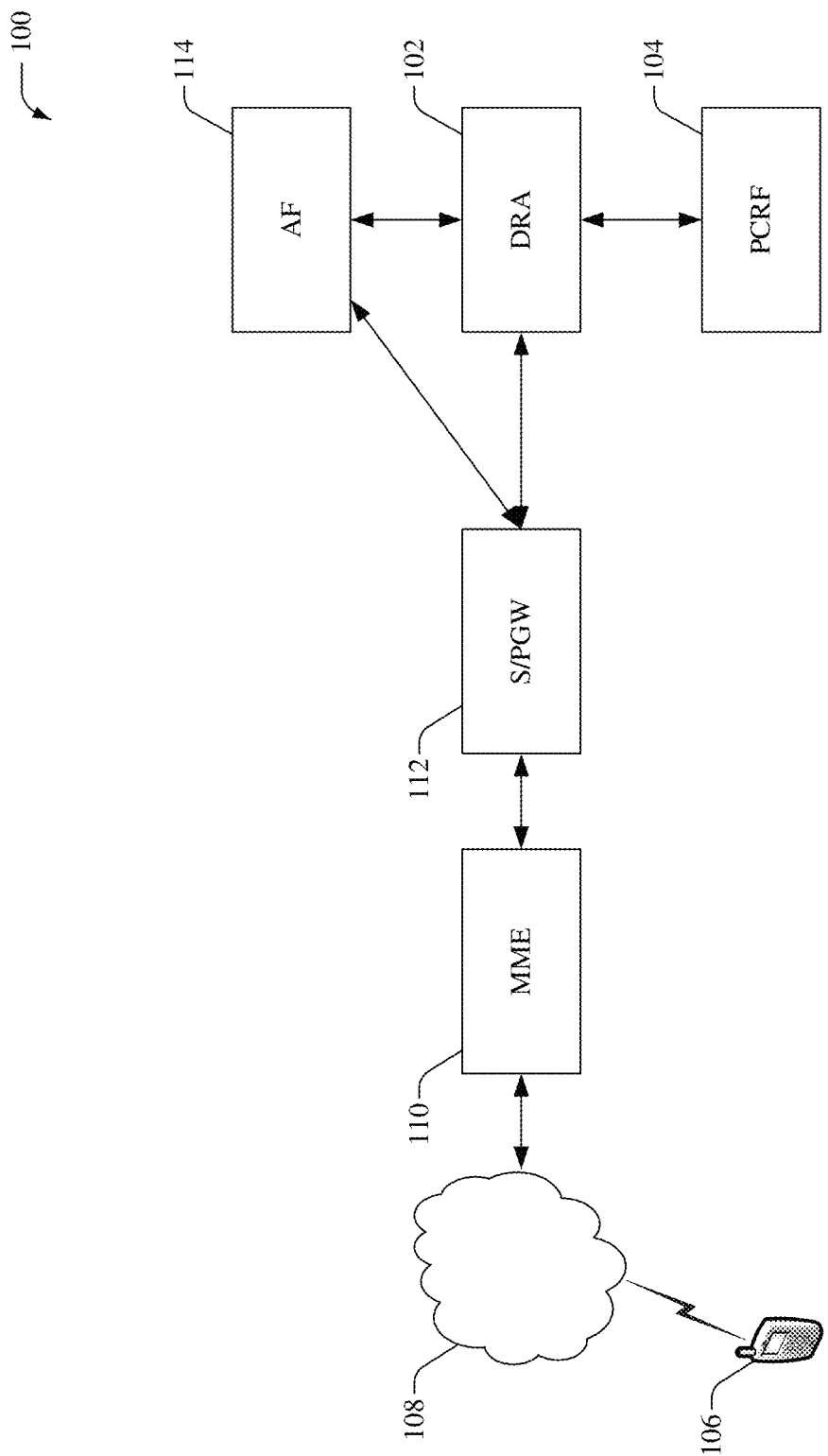
FIG. 1 illustrates an example system that facilitates establishment of application services based on routing of node identifier data.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "function," "gateway," "agent," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 5G and/or long term evolution (LTE), or other next generation networks, the disclosed aspects are not limited to 5G, a UMTS implementation, and/or an LTE implementation as the techniques can also be applied in 3G or other network systems. For example, aspects or features of the disclosed embodiments can be exploited in substantially any wireless communication technology. Such wireless communication technologies can include universal mobile telecommunications system (UMTS), code division multiple access (CDMA), Wi-Fi, worldwide interoperability for microwave access (WiMAX), general packet radio service (GPRS), enhanced GPRS, third generation partnership project (3GPP), LTE, third generation partnership project 2 (3GPP2) ultra mobile broadband (UMB), high speed packet access (HSPA), evolved high speed packet access (HSPA+), high-speed downlink packet access (HSDPA), high-speed uplink packet access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating improved communication coverage for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Conventional evolved pack core (EPC) networks rely on a binding database coupled to a diameter routing agent (DRA) to forward an application request to the correct Policy and Charging Rules Function (PCRF) that hosts a session related to the application request. In particular, the DRA binding database comprises records for PCRF routing information per IP connectivity access network (IP-CAN) session. Thus, each user equipment (UE) coupled to the packet core network can have multiple records stored in the binding database (e.g., a first record for international mobile subscriber identity (IMSI)+access point name (APN), a second record for mobile station international subscriber directory number (MSISDN)+APN, a third record for Internet Protocol version 6 (IPv6)). Accordingly, the binding database for a large communication network can comprise millions of records. Unavailability of this binding database can cause application service outage, resulting in a significant revenue loss. Moreover, without the binding database, there is no way for the DRA to process incoming application service requests and route the requests to appropriate host PCRFs. For example, when a binding database is not available, and a UE initiates a voice over LTE (VoLTE) call, the VoLTE call will fail until the binding database is restored. The same is true for other application services as well. To overcome these challenges, the systems and methods disclosed herein relate to processing application service requests without implementing and/or employing a DRA binding database. In contrast with conventional systems, the systems and methods disclosed herein utilize node identifiers assigned to packet core nodes and route the node identifiers to the DRA within a call flow message that is employable to establish an application service.

Referring initially to FIG. 1, there illustrated is an example system 100 that facilitates an establishment of application services based on routing of node identifier data, according to one or more aspects of the disclosed subject matter. In one aspect, system 100 enables a DRA 102 to accurately determine a policy node, for example, a host PCRF 104, for establishing a dedicated bearer for an application service requested by a UE 106. As an example, the UE 106 can comprise, but is not limited to, most any industrial automation device and/or consumer electronic device, for example, a tablet computer, a digital media player, a wearable device, a digital camera, a media player, a cellular phone, a personal computer, a personal digital assistant (PDA), a smart phone, a laptop, a gaming system, set top boxes, home security systems, an Internet of things (IoT) device, a connected vehicle, at least partially automated vehicle (e.g., drones), etc. System 100 can be part of most any communication network, such as, but not limited to an LTE network, a 5G network and/or other next-generation networks.

The DRA 102 is employed to provide real-time routing functions that allow messages to be routed to the correct network devices. In one aspect, the DRA 102 can facilitate session binding (e.g., in IP-CAN sessions) towards the PCRF 104. Moreover, the session binding is utilized to handle multiple Diameter sessions in application services. For example, in VoLTE services, the LTE parts of a VoLTE call, together with the IP Multimedia Subsystem (IMS) parts of the call, are controlled by the same PCRF (e.g., PCRF 104). Additionally, consistent policy rules need to be applied to the session that are related to the same VoLTE call. The PCRF 104 can be utilized to implement policy control decision and flow-based charging control functionalities. The PCRF 104 can provide network control regarding the service data flow detection, gating, quality of service (QoS) and flow-based charging towards a policy and charging enforcement function (PCEF) (not shown). An application function (AF) 114, can provide session and media related information to the PCRF 104, which in turn can notify the AF 114 of traffic plane events. In case of VoLTE, the PCRF 104 can communicate with devices of the IMS network for establishing the VoLTE calls and allocating the requested bandwidth to the call bearer, for example, with configured attributes.

When UE 106 initially registers with the network, for example via an access network 108, a default bearer is established for communicating with the network or applications. As part of UE attach procedure, the serving MME (e.g., MME 110) sends a request (e.g., create session request (CSR)) to the serving and packet data network gateway (PGW) (e.g., S/PGW 112), which then sends a request (e.g., a Gx credit control request (CCR-I)) to a host PCRF 104 via the DRA 102. The host PCRF 104 can respond to the request (e.g., by transmitting a Gx credit control answer (CCA-I)) and initiate establishment of the default bearer. When the UE 106 initiates an application service (e.g., makes a VoLTE call) via application function (AF) 114 (e.g., proxy-call session control function (P-CSCF) in case of VoLTE service), the same PCRF that was employed to establish the default bearer (e.g., PCRF 104) is to be utilized to establish a dedicated bearer for the application service.

According to an aspect, to ensure that the host PCRF 104 is accurately determined during application service establishment, system 100 facilitates routing of identifier information associated with the packet core nodes (e.g., PCRF 104, S/PGW 112, etc.). For example, the node identifiers for PCRF 104 and S/PGW 112 can be introduced into the end-to-end application call flow. In an aspect, the node identifiers are configurable and can be assigned as the hostname of the node or most any defined identifier (e.g., 16-bit identifier). In one aspect, during establishment of the default bearer, the PCRF 104 can transmit its identifier to the S/PGW 112 via the DRA 102. For example, the identifier can be included within and/or appended to a Gx CCA-I message. In another example, the identifier can be transmitted within a new message. In one embodiment, the node identifiers can be deployed in the core network, such that on default bearer establishment, the S/PGW 112 can notify the AF 114 with node identifier for the PCRF 104 as well as the S/PGWs 112's identifier. In this example scenario, the AF 114 can store the identifiers and provide them to the DRA 102 on receiving an application service request from the UE 106. The DRA 102 can utilize the identifiers to direct the request to the appropriate host PCRF 104 to facilitate establishment of the dedicated bearer for the application service.

In another embodiment, the node identifiers can be extended to the UE 106, such that on default bearer establishment, the S/PGW 112 can relay the node identifiers to the UE 106. In this example embodiment, the identifiers can be stored within the UE 106 and can be transmitted to the AF 114 within (and/or along with) an application service request. The AF 114 can then forward the identifiers to the DRA 102, which can utilize the identifiers to direct the request to the appropriate host PCRF 104 to facilitate establishment of the dedicated bearer for the application service. These embodiments enable the DRA 102 to efficiently determine host PCRFs independent of using and/or maintaining a large binding database.

It is noted that the network functions shown in the figures are for illustration purposes and that the subject embodiment architecture can be extended to other network implementations. For example, the FIG. 1 shows the combined Serving GW and Packet GW (e.g., S/PGW 112). However, the implementation can also combine the MME 110 with the SGW and PGW (e.g., S/PGW 112) is an independent network function. This principle applies to any wireless network implementation variations.

Referring now to FIGS. 2A-D, there illustrated is an example end-to-end application call flow (200, 225, 250, 275) that deploys a policy node identifier in packet core network devices, in accordance with an aspect of the subject disclosure. It is noted that the DRA 102, PCRF 04, UE 106, S/PGW 112, and AF 114 can comprise functionality as more fully described herein, for example, as described above with regard to system 100. Although the call flow (200, 225, 250, 275) has been described with respect to an LTE network, it is noted that the subject disclosure is not limited to LTE networks and can be utilized in most any communication network.

FIGS. 2A-D provide an easy-to-deploy solution that provides an efficient way to find the correct PCRF (e.g., host PCRF for a session) while minimizing service impact to end-user or application. According to an aspect, the core network policy nodes, for example, PCRF 104 and S/PGW 112, can be assigned respective identifiers within the network. In an example, the identifiers can comprise 16 bits. In another example, the identifier can comprise, but is not limited to, a hostname of the node, a numeric number, IP address, or a L2 link address. According to an aspect, end-to-end application call flows can be modified to transfer the identifier data during the call flow to facilitate PCRF determination. In an aspect, a SGi interface between S/PGW and P-CSCF can be utilized to convey and/or update the identifier data.

Figure 2A:
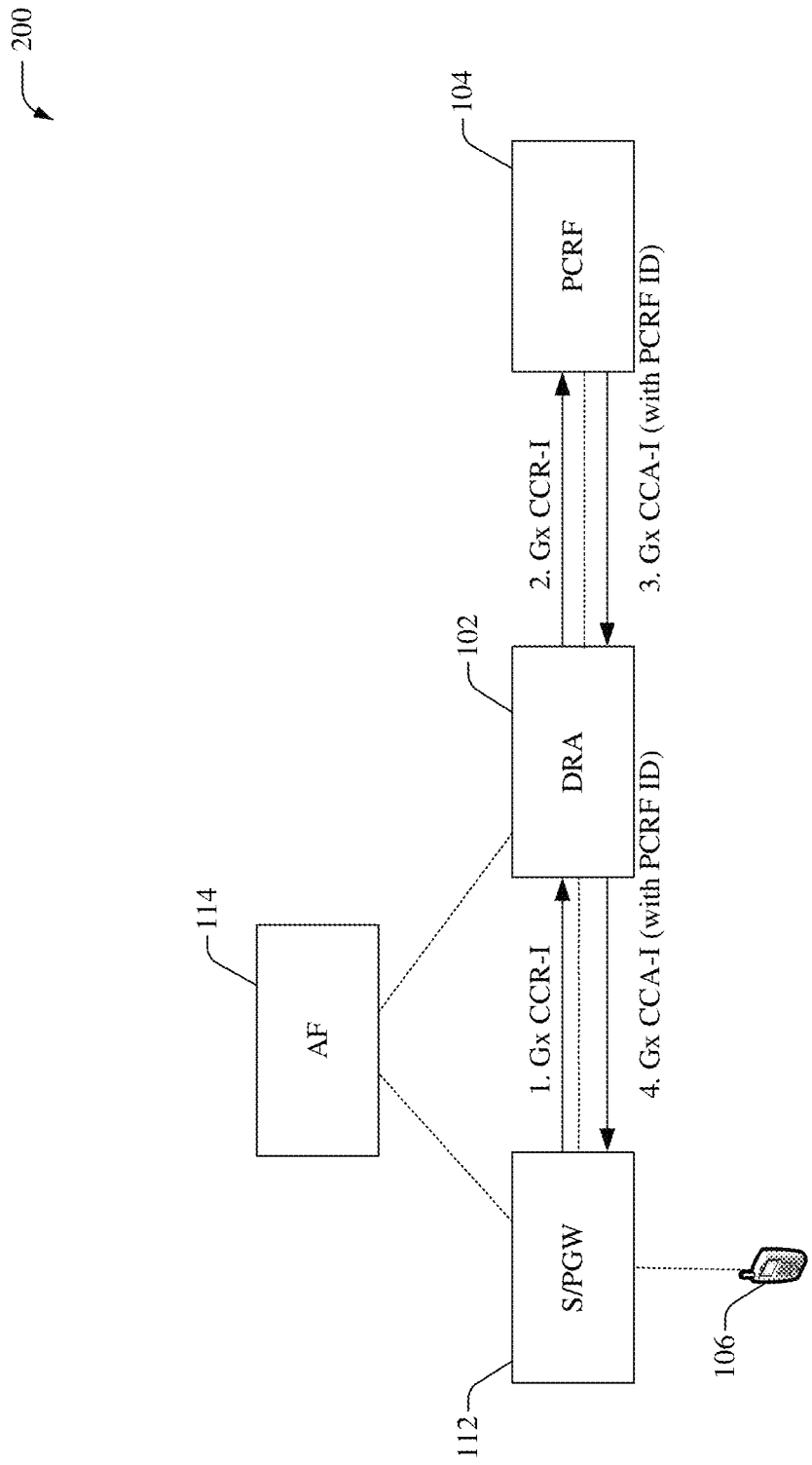

Referring to FIG. 2A, when UE 106 attaches to the network (e.g., during power up, entry within a coverage area of the network, etc.), a request (e.g., CSR) is sent from the MME (shown in FIG. 1) to the S/PGW 112. As depicted at (1), the S/PGW 112 sends a request (e.g., Gx CCR-I) to establish a default bearer, to the DRA 102, which can then determine a PCRF, for example, PCRF 104 to service the request. At (2), the DRA relays the request (e.g., Gx CCR-I) to the PCRF 104. At (3), the PCRF 104 transmits a response (e.g., Gx CCA-I (with PCRF ID)) to the DRA 102. In one aspect, PCRF 104's identifier is included within and/or appended to the response. At (4), the DRA 102 can relay the response (and PCRF ID) to the S/PGW 112, which can then send a create session response to MME to facilitate establishment of a default bearer for the UE 106.

Figure 2B:
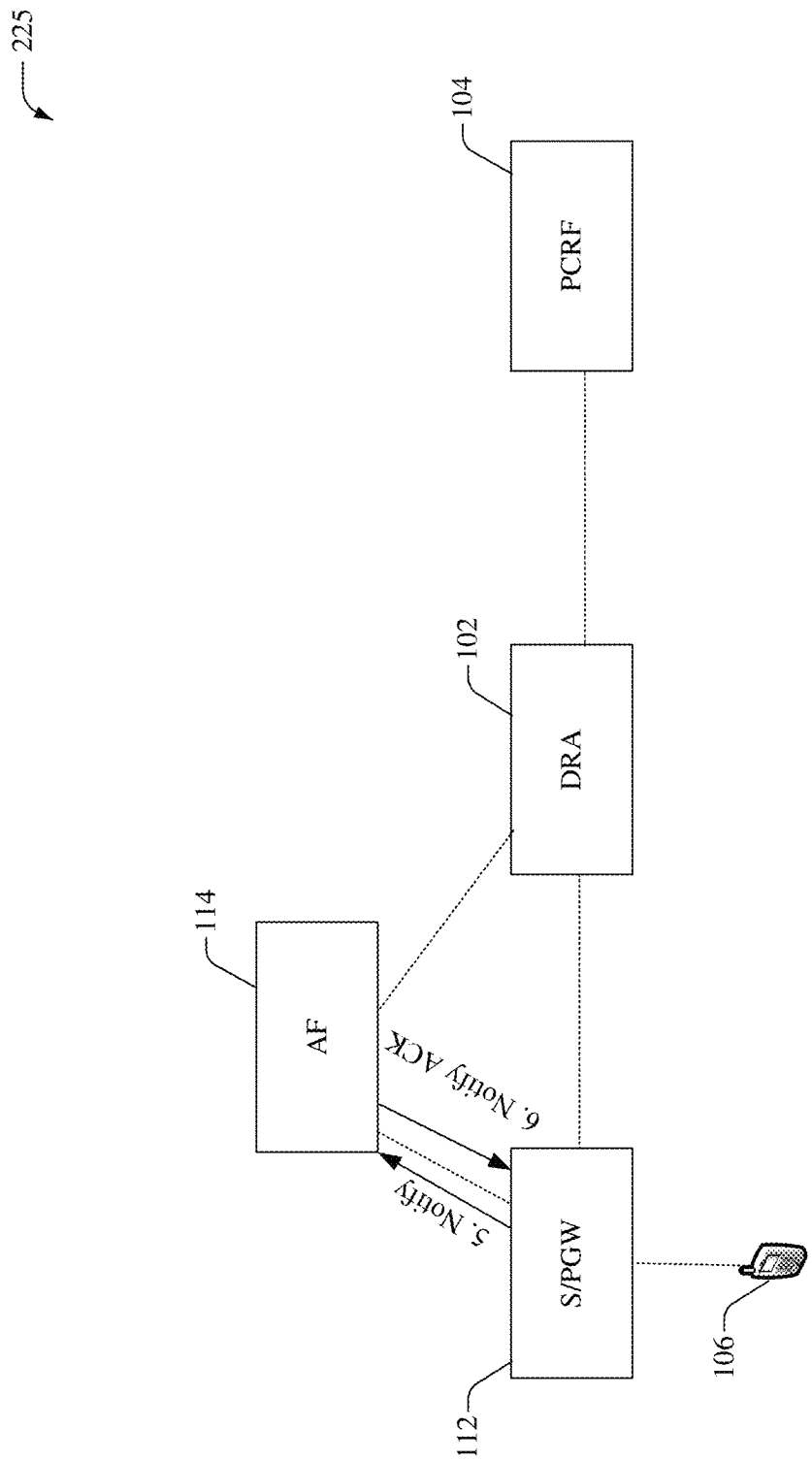

Referring to FIG. 2B, when the response (e.g., Gx CCA-I (with PCRF ID)) is received from the PCRF 104 and the default bearer is successfully established, at (5) the S/PGW 112 can send a notify message (e.g., in-band and/or out-of-band) to AF 114. As an example, the notify message can comprise information, such as, but not limited to, bearer information, the PCRF ID, and the S/PGW 112's identifier (e.g., PGW ID). Alternatively, the identifiers (e.g., PCRF ID and PGW ID) can be transmitted within (and/or appended to) a session initiation protocol (SIP) Register message. In one aspect, an existing link between the S/PGW 112 and the AF 114 can be leveraged to transfer the identifiers. The AF 114 can store the transferred information within its data store and at (6) can transmit an acknowledge message back to the S/PGW 112.

Referring now to FIG. 2C, when an application service is to be initiated, (e.g., at (7) UE 106 can send a SIP INVITE message to AF 114), the AF 114 can determine the stored PCRF and PGW identifiers and generate a Rx AA-Request (AAR) that comprises the PCRF and PGW identifiers. In case the notify message is not received at the time of the SIP INVITE message arrival, at (7a) the AF 114 can pull the node identifiers from the S/PGW 112 to avoid any race conditions. At (8), the AF 114 can transfer the Rx AAR and the PCRF and PGW identifiers to the DRA 102. The DRA 102 can identify the PCRF hostname from the received PCRF identifier and at (9) route the message to the correct PCRF. Since the destination node information is provided in the Rx AAR, the implementation and/or maintenance of a complex binding database can be avoided. At (10) and (11), an Rx AA Answer (AAA) message can be transferred from the PCRF 104 to the AF 114 via the DRA 102.

Figure 2D:
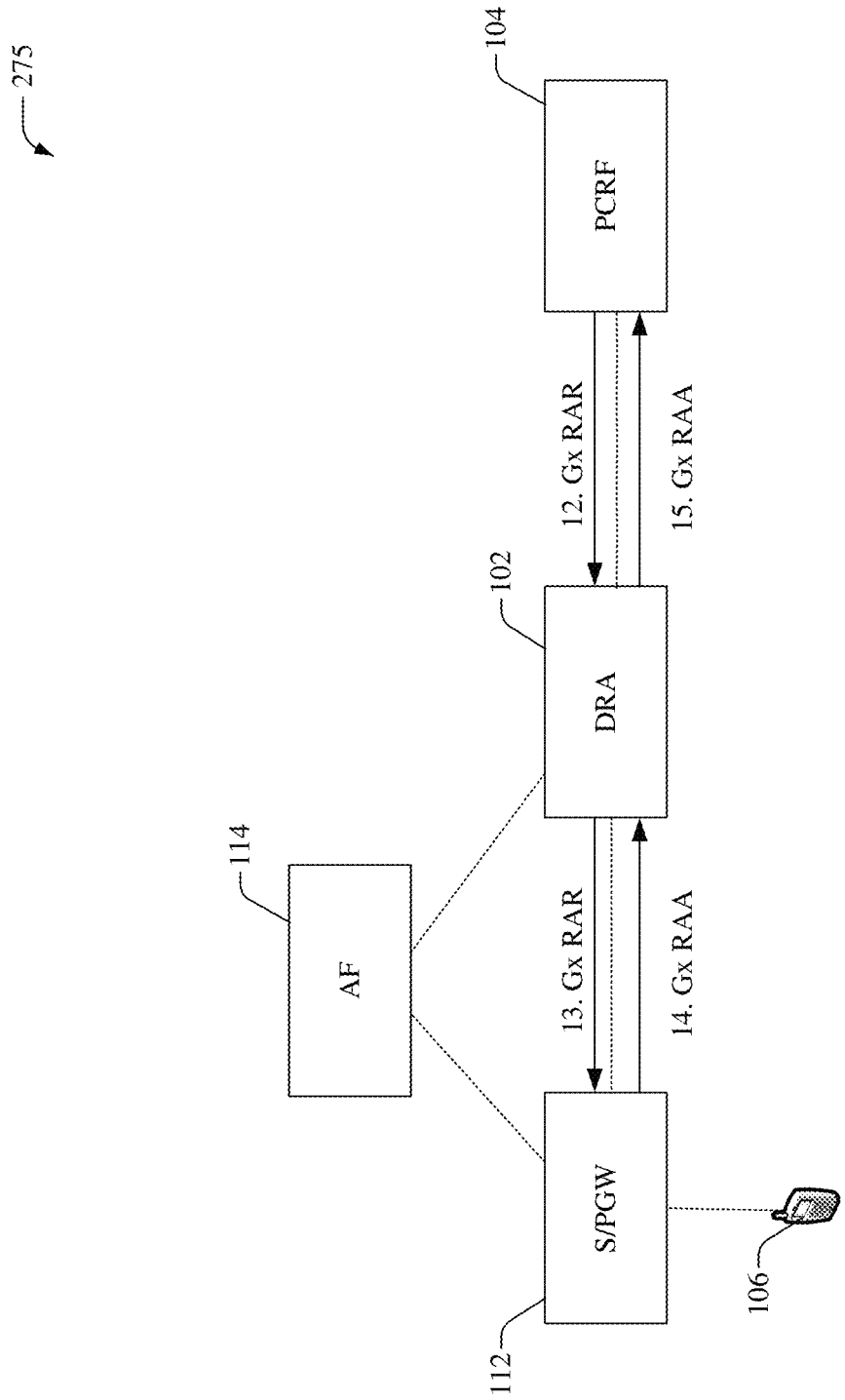

FIG. 2D illustrates establishment of a dedicated bearer. The PCRF 104 can determine a Gx session to which the incoming Rx AAR should be bound. Further, the PCRF 104 can create charging rules and at (12) and (13) send a message (e.g., Gx RAR) to S/PGW 112 via the DRA 102. At (14) and (15), the S/PGW 112 can respond (e.g., Gx RAA) to the PCRF 104 via the DRA 102. Further, the S/PGW 112 can then establish a dedicated bearer for the application service associated with (e.g., initiated by) UE 106.

Figure 3A:
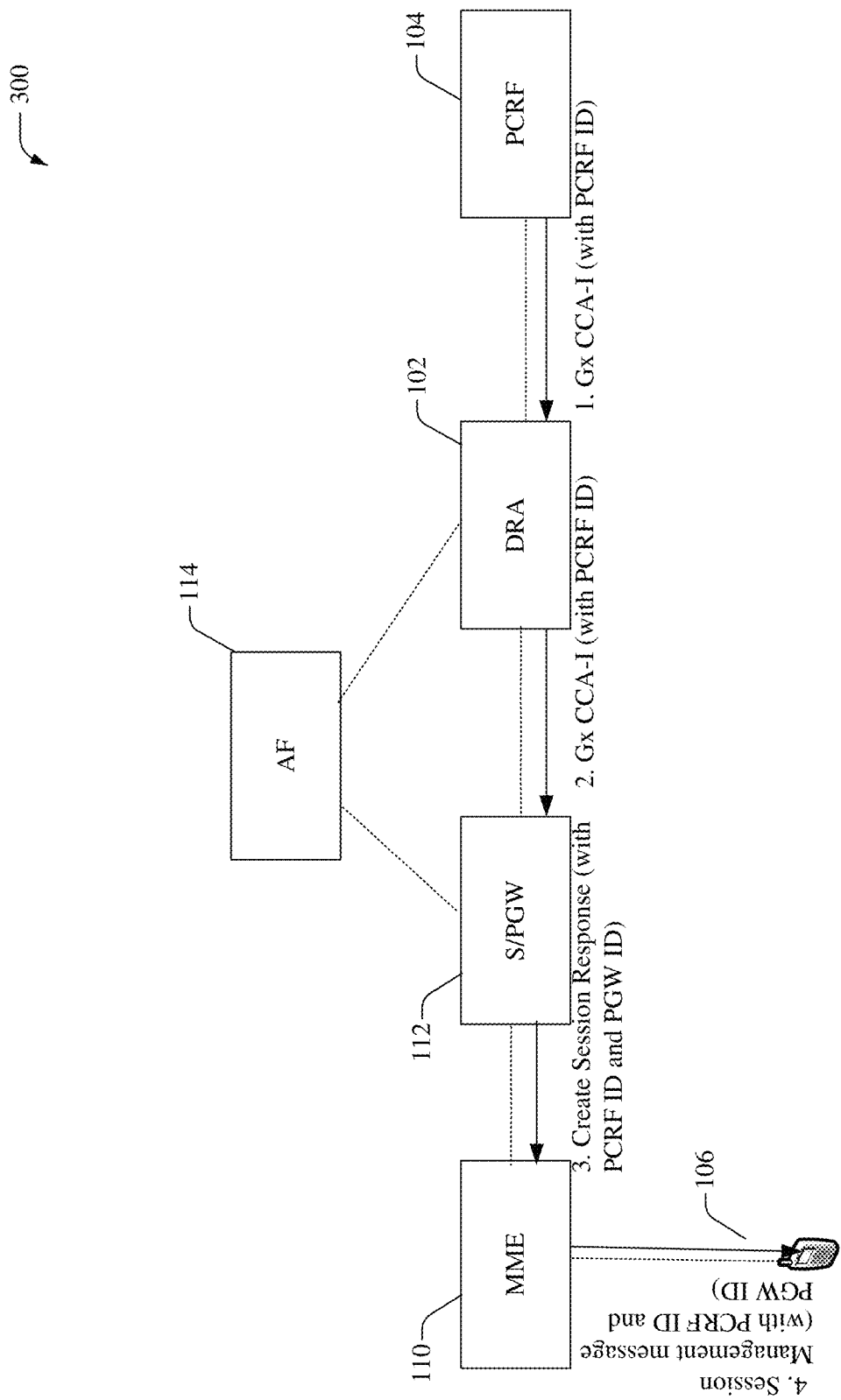
FIGS. 3A-B illustrate an example message sequence flow chart that deploys a policy node identifier in user equipment (UEs).
Figure 3B:
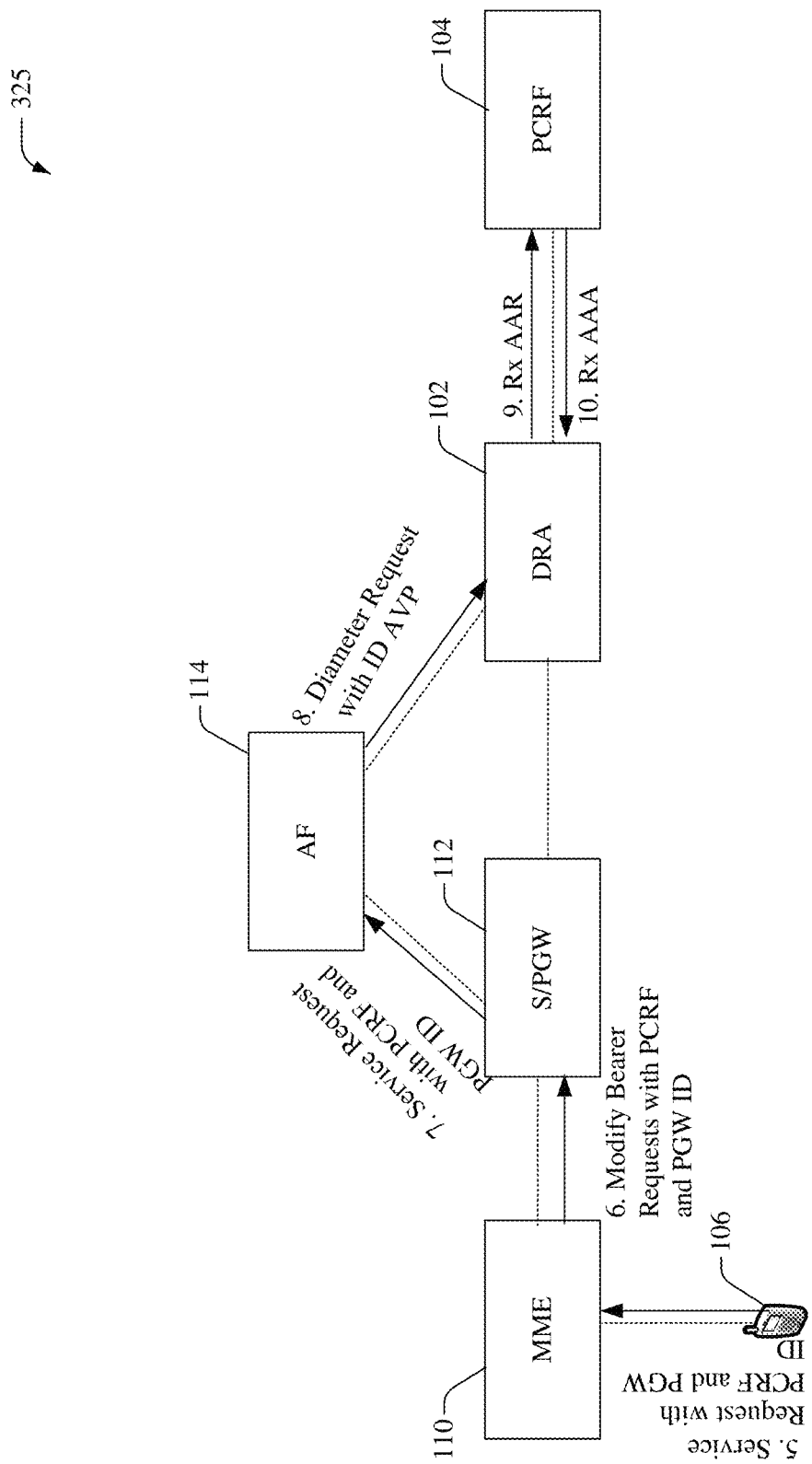

Referring now to FIGS. 3A-B, there illustrated an example end-to-end application call flow (300,350) that deploys policy node identifier in UEs, in accordance with an aspect of the subject disclosure. FIGS. 3A-B provide a long-term solution that delivers an efficient way for a DRA 102 to find the correct PCRF while eliminating a dependency on centralized binding database comprising millions of records. It is noted that the DRA 102, PCRF 04, UE 106, S/PGW 112, and AF 114 can comprise functionality as more fully described herein, for example, as described above with regard to system 100. Although the call flow (300, 350) has been described with respect to an LTE network, it is noted that the subject disclosure is not limited to LTE networks and can be utilized in most any communication network that employs a policy driven service architecture.

Similar to flow 200, when UE 106 attaches to the network (e.g., during power up, entry within a coverage area of the network, etc.), a request (e.g., create session request) is sent from the MME 110 to the S/PGW 112. The S/PGW 112 can send a request to establish a default bearer (e.g., Gx CCR-I) to the DRA 102, which can then determine a destination PCRF, for example, PCRF 104 to service the request. The DRA can then relay the request (e.g., Gx CCR-I) to the PCRF 104. At (1), the PCRF 104 can transmit a response (e.g., Gx CCA-I (with PCRF ID)) to the DRA 102. In one aspect, PCRF 104's identifier can be included within and/or appended to the response. At (2), the DRA 102 can relay the response (and PCRF ID) to the S/PGW 112. In this embodiment, at (3), the S/PGW 112 can transmit the response to the MME 110 along with the PCRF ID and the S/PGW 112's identifier (PGW ID). For example, the PCRF and PGW IDs can be included as an information element (IE) in a GPRS tunneling protocol (GTP) create session response to MME 110. The MME 110 can facilitate establishment of a default bearer for the UE 106. At (4), the MME 110 can send the PCRF and PGW IDs to the UE 106, for example, in a non-access stratum (NAS) message (e.g., ESM Message Container IE). The identifiers can be stored and maintained in a data store of the UE 106.

Referring to FIG. 3B, subsequent to the establishment of the default bearer, service requests (e.g., VoLTE SIP call) initiated by the UE 106 can comprise the PCRF and PGW IDs (at (5)). At (6), the MME 110 can relay the request and IDs to the S/PGW 112, which can provide the request data (comprising the IDs) to the AF 114 (at (7)). The AF 114 can include/insert/append the PCRF ID attribute value pair (AVP) in a diameter request message that is transmitted to the DRA 102 (at (8)). On receipt of the request, the DRA 102 can query a global node identifier to hostname mapping table to identify the destination PCRF and at (9) route the message to the identified PCRF 104. It is noted that the mapping table utilized by the DRA 102 is much smaller than a conventional binding database. Moreover, the mapping table simply comprises one entry per PCRF coupled to the DRA, resulting in a table with much smaller entry sizes (<<1000 entries) depending on the carrier network size. In contrast, the conventional binding database comprises millions of records based on number of application sessions. Accordingly, since the mapping table is significantly smaller, the work performed by DRA 102 for determining a destination PCRF is substantially reduced. In one example, the DRA 102 can dynamically maintain and/or update the mapping table by receiving information (e.g., periodically) from the PCRFs and/or other DRAs. At (10) and (11), an Rx AAA message can be transferred from the PCRF 104 to the AF 114 via the DRA 102. A dedicated bearer can then be established (e.g., as shown in call flow 275).

It is noted that the call flow (200-275) depicted in FIGS. 2A-2D is easier to deploy as compared to the call flow (330-35) depicted in FIGS. 3A-3B since only the packet core nodes and their call flows are modified in 200-275, whereas 300-350 extends the node identifier deployment to the MME and UE (e.g., which can typically take longer to implement).

Figure 4:
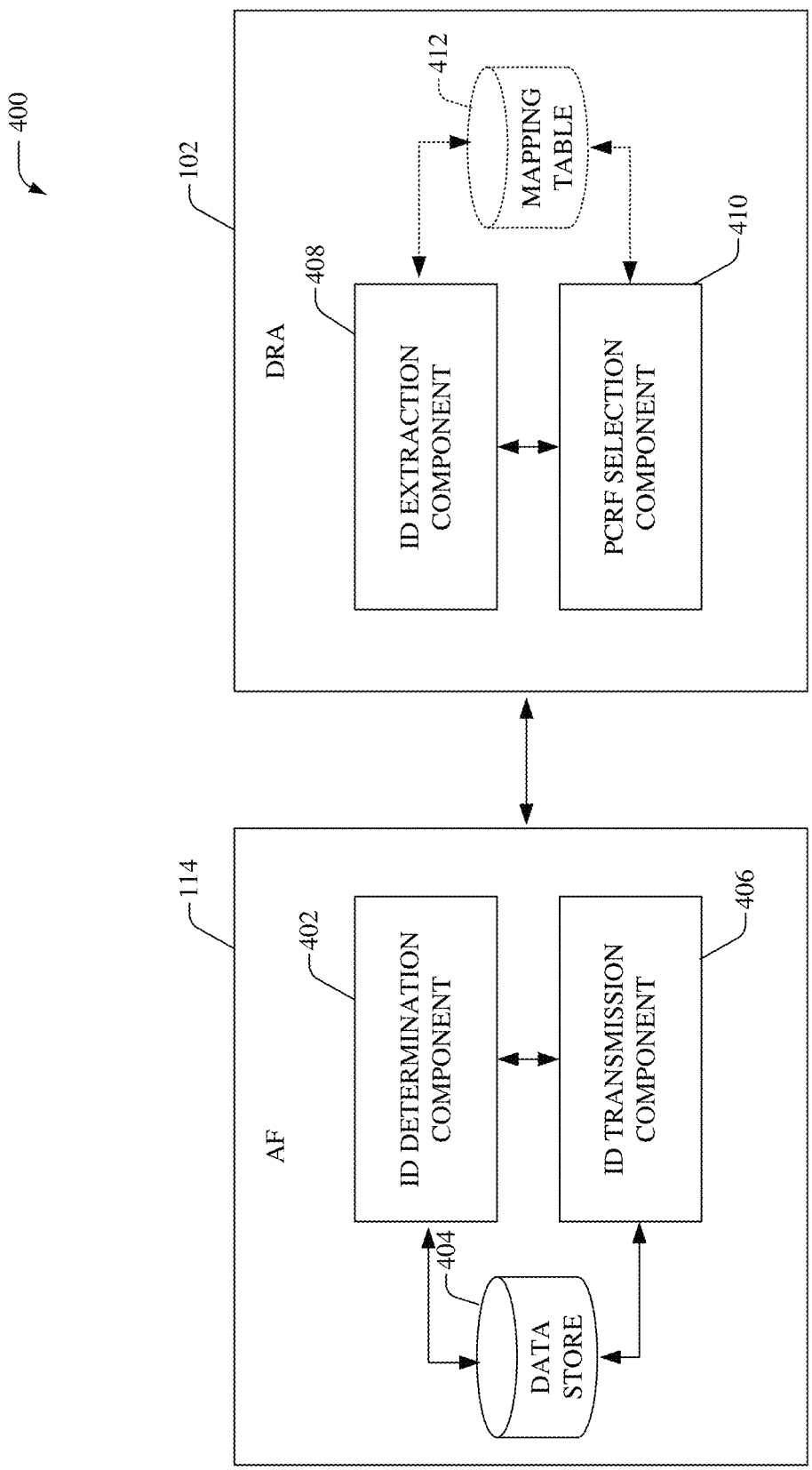
FIG. 4 illustrates an example system that routes node identifiers to a diameter routing agent (DRA) to facilitate policy and charging rules function (PCRF) selection.

Referring now to FIG. 4, there illustrated is an example system 400 that routes node identifiers to a DRA to facilitate PCRF selection, according to an aspect of the subject disclosure. It is noted that the DRA 102 and AF 114 can comprise functionality as more fully described herein, for example, as described above with regard to systems 100-300. According to an aspect, policy network nodes (e.g., PCRF, PGW) can be assigned an identifier in the network. As an example, the identifier can comprise a hostname, a numeric number, IP address, L2 link address, etc. In another example, the identifier can comprise a 16-bit identifier that applies to a pool of nodes that share a common session database, wherein the higher 8-bit can be reserved for a first node, for example, a PGW and the lower 8-bit can be reserved for a second node, for example, a PCRF. The identifier can be configured and/or updated at most any time.

In a first embodiment, wherein changes are made only within the core network (e.g., depicted in detail with respect to call flows 200-275), the identifier can comprise a hostname of the node. In this example embodiment, PGW and PCRF identifiers can be introduced into the default bearer establishment for a served UE, such that the PCRF can utilize an interface between the PCRF and the PGW (e.g., Sgi interface) to convey and/or update the identifiers. According to an aspect, an ID determination component 402 can receive identifier data (e.g., PCRF ID and PGW ID) from the PGW serving the UE. As an example, the identifier data can be received in a push or pull configuration. In one aspect, the identifier data can be received via in-band and/or out-of band communication. In yet another aspect, the identifier data can be received via a SIP register message. The ID determination component 402 can store the identifier data (e.g., linked to the UE/session/bearer information), within a data store 404. When determined that an application service is initiated by the UE (e.g., a SIP INVITE message is received from the UE), an ID transmission component 406 can be utilized to transfer the identifier data (e.g., PCRF ID and PGW ID) associated with the UE to the DRA 102. As an example, the ID transmission component 406 can insert/append the identifier data within/to an Rx AAR message. Alternatively, the ID transmission component 406 can transfer the identifier data via a new message. In an aspect, an ID extraction component 408 can extract the identifier data from the received message, a PCRF selection component 410 can determine (e.g., based on the PCRF hostname determined from the PCRF identifier) a destination PCRF to which the message (e.g., Rx AAR message) is to be relayed, and the DRA 102 can transmit the message to the determined PCRF to facilitate establishment of a dedicated bearer. Accordingly, the DRA 102 can efficiently determine a destination PCRF without searching through millions of records of a binding database.

In a second embodiment, wherein changes are extended to the MME and UE (e.g., depicted in detail with respect to call flows 300-350), the identifier can comprise a 16-bit identifier that can map to a PGW hostname and a PCRF hostname. In this example embodiment, PGW and PCRF identifiers can be introduced into the default bearer establishment for a served UE, such that the PCRF can utilize an interface between the PCRF and the PGW (e.g., Sgi interface) to convey and/or update the 16-bit identifier and further, the PGW/serving gateway (SGW) can include the identifier as an IE in a GTPv2-C Create Session Response to a MME, which in turn can send the identifier to the UE in a NAS Message (e.g., ESM Message Container IE). The identifier can be stored and maintained in the UE. Moreover, the UE can transmit the identifier in (and/or along with) subsequent service related messages (e.g. VoLTE SIP call) to the AF 114. On receiving the service related message, the ID determination component 402 can extract the identifier and the ID transmission component 406 can add the identifier, for example, as a node identifier AVP, in the diameter message and transmit the diameter message to the DRA 102. The ID extraction component 408 can receive the diameter message and determine the node identifier AVP. Further, the PCRF selection component 410 can utilize the AVP to query a mapping table 412 to determine the PCRF host name. In one example, the mapping table 412 can store a mapping of node identifiers with hostnames of destination nodes. Based on the PCRF host name, the DRA 102 can forward the diameter message to the appropriate PCRF. This approach is very efficient in finding the right PCRF or policy node and eliminates the dependency on centralized binding database which contains millions of records.

Figure 5:
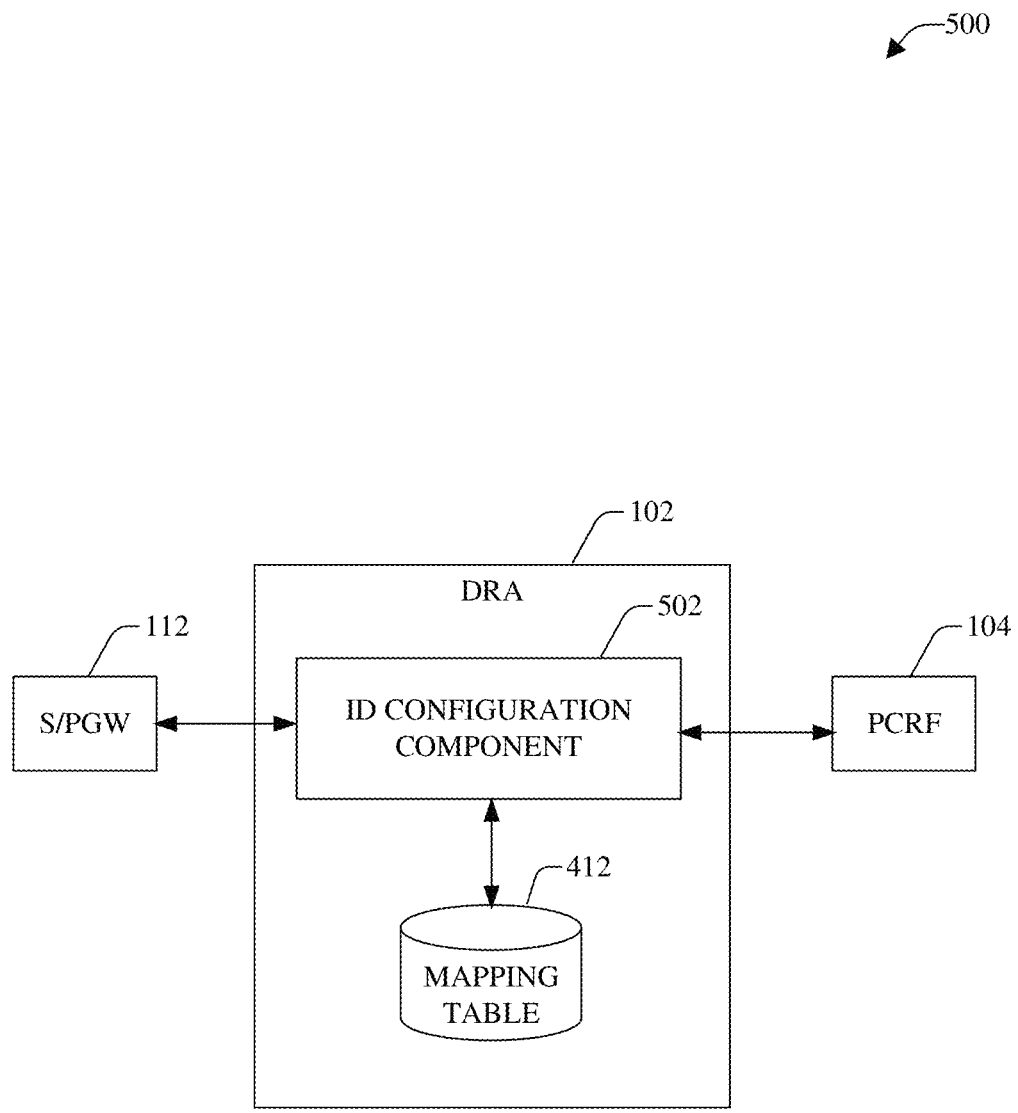
FIG. 5 illustrates example system that facilitates configuration of node identifiers.

Referring now to FIG. 5, there illustrated is an example system 500 that facilitates configuration of policy node identifiers in accordance with the subject embodiments. It is noted that the DRA 102, PCRF 104, and S/PGW 112 can comprise functionality as more fully described herein, for example, as described above with regard to systems 100-400. According to an aspect, when node identifiers are extended to the MME and UE (e.g., depicted in detail with respect to call flows 300-350), network nodes, such as PCRF 104 and S/PGW 112, can be configured with a common identifier to facilitate detection during dedicated bear establishment. As an example, the identifier can comprise a 16-bit identifier (e.g., Hex) that can represent both the host S/PGW 112 and the host PCRF 104 (e.g., eight bits reserved for each node). The identifier can be maintained by node (e.g., PCRF 104 and/or S/PGW 112) and shared with the ID configuration component 502, at most any time, such as, but not limited to, during a node power-up, periodically, in response to an event, on-demand, etc. The ID configuration component 502 can store the identifier with corresponding node hostnames in the mapping table 412 as shown below:

TABLE 1

| Node Identifier (hex) | PCRF Host name | PGW Host name |
|---|---|---|
| 0x0101 | Pcrf01.host.name | Pgw01.host.name |
| 0x0202 | Pcrf02.host.name | Pgw02.host.name |
| 0x0303 | Pcrf03.host.name | Pgw03.host.name |

As described in detail with regards to call flow 300-350, the identifier is transferred to the UE during default bearer establishment and then transmitted by the UE to the AF during service initiation. The AF provides the identifier to the DRA 102 as part of (and/or along with) a diameter request. Moreover, the DRA 102 can utilize the mapping table 412 to determine hostnames for the nodes and select appropriate nodes, to which the diameter request is to be relayed (e.g., to facilitate dedicated bearer establishment).

Figure 6:
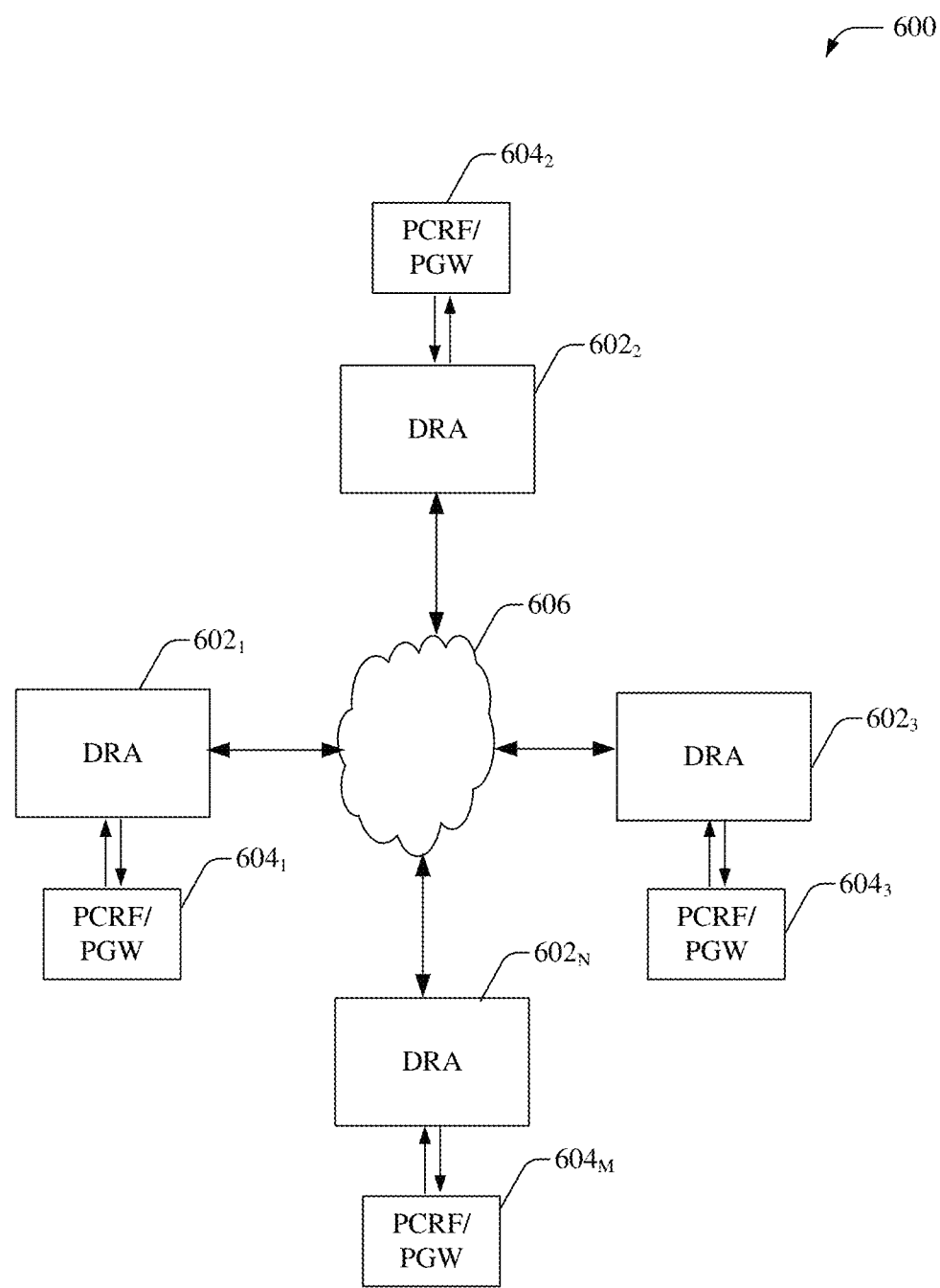
FIG. 6 illustrates an example system that facilitates a generation of a global mapping table in accordance with the subject embodiments.

FIG. 6 illustrates an example system 600 that facilitates a generation of a global mapping table in accordance with the subject embodiments. It is noted that the DRAs $602_1$-$602_N$ (wherein N is most any integer greater than 1) are substantially similar to DRA 102 and can comprise functionality as more fully described herein, for example, as described above with regard to DRA 102. Further, PCRF/PGW $604_1$-$604_M$ (wherein M is most any integer greater than 1) are substantially similar to PCRF 104 and/or S/PGW 112 and can comprise functionality as more fully described herein, for example, as described above with regard to PCRF 104 and/or S/PGW 112. According to an embodiment, DRAs $602_1$-$602_N$ can auto-learn (e.g., via a push or pull configuration) node identifier data associated with connected nodes (e.g., PCRF/PGW $604_1$-$604_M$) and add it to a global mapping table comprising a node identifier to hostname mapping (e.g., mapping table 412 within one or more of DRAs $602_1$-$602_N$ and/or a network data store coupled to network 606).

Figure 7:
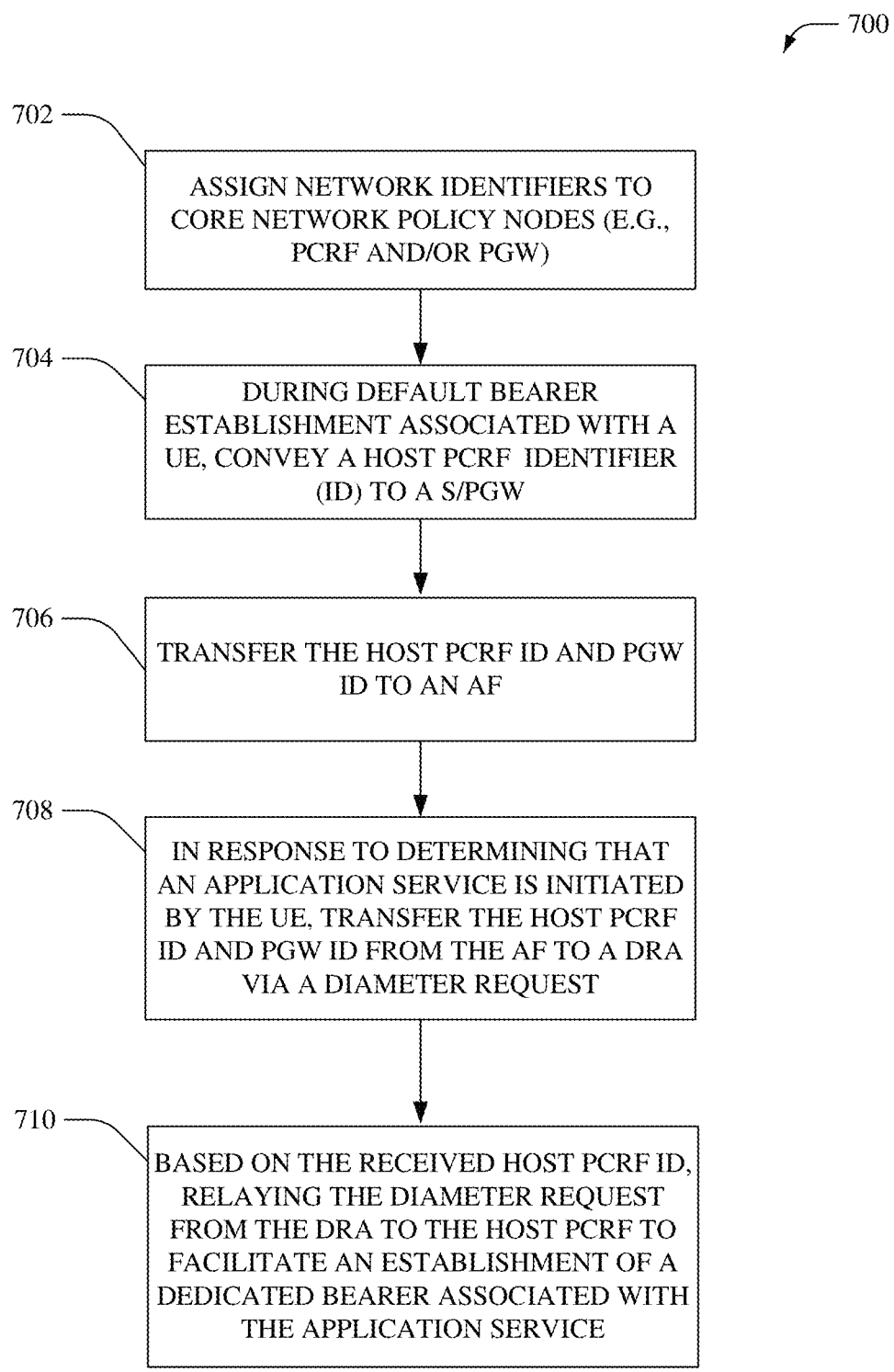
FIG. 7 illustrates an example method that efficiently determines a host policy node during establishment of a dedicated bearer.
Figure 8:
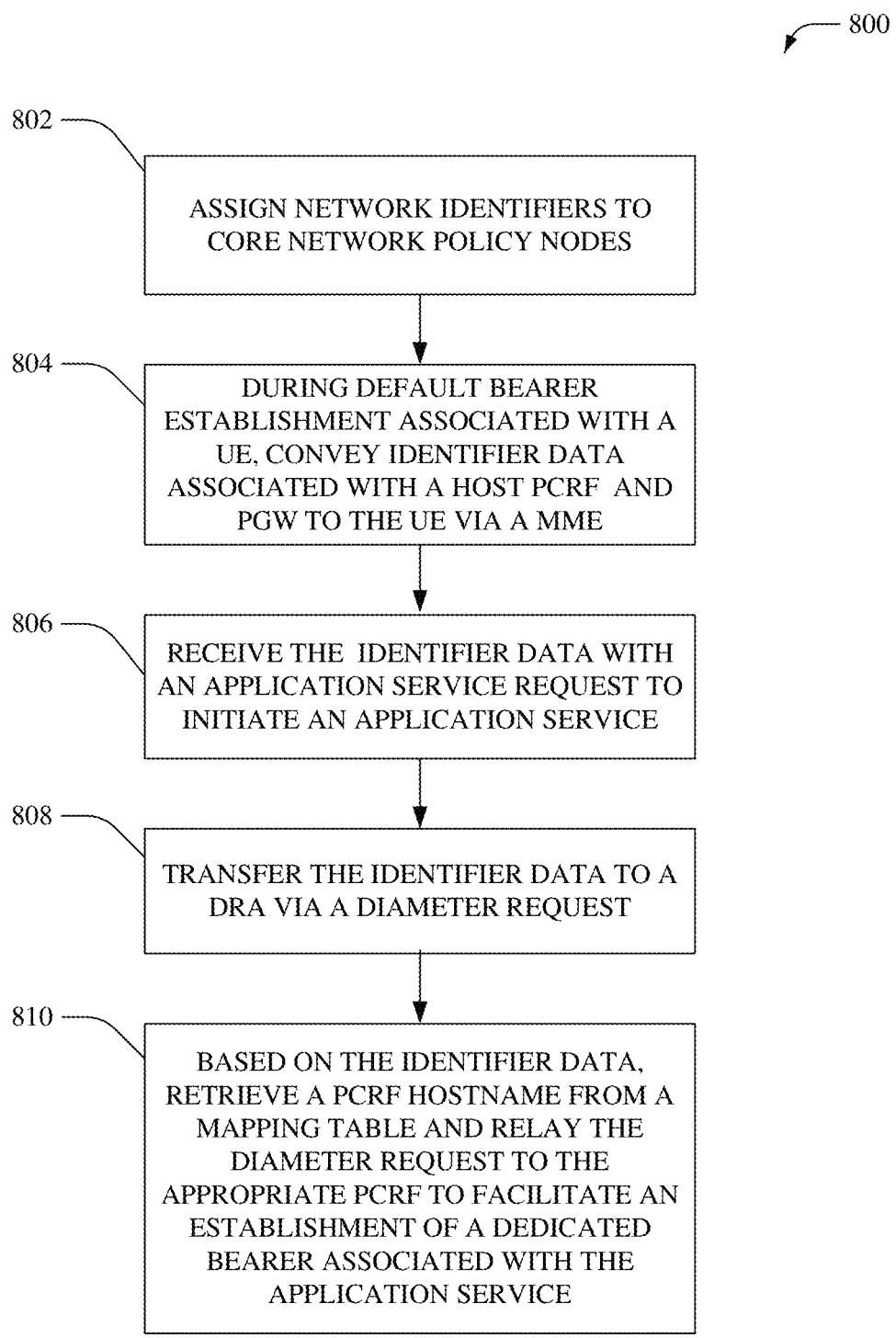
FIG. 8 illustrates an example method that facilitates a detection of a host policy node based on a transfer of identifier data to a UE.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that efficiently determines a host policy node during establishment of a dedicated bearer, according to an aspect of the subject disclosure. In an aspect, method 700 can be implemented by one or more network devices (e.g., core network devices) of a communication network (e.g., cellular network). At 702, network identifiers can be assigned to core network policy nodes (e.g., PCRF and/or PGW). As an example, the network identifiers can comprise a hostname, a numeric value, an IP address, a L2 link address, etc. At 704, during default bearer establishment associated with a UE (e.g., when a UE powers on, enters the network coverage area, etc.), a policy node identifier, for example, a host PCRF ID, can be conveyed to a gateway node, for example, a S/PGW. As an example, the PCRF ID can be transmitted within and/or appended to a Gx CCA-I message. When the default bearer is successfully established, at 706, the host PCRF ID and a PGW ID can be transferred to an AF (e.g., a P-CSCF), for example, via in-band signaling, via out-of band signaling, via a SIP register message, etc.

Further, at 708 in response to determining that an application service has been initiated by the UE (e.g., based on receiving a SIP INVITE message from the UE), the host PCRF ID and PGW ID can be transferred to a DRA via a diameter request (e.g., Rx AAR message). At 710, based on the received host PCRF ID, the diameter request can be relayed to an appropriate PCRF to facilitate an establishment of a dedicated bearer associated with the application service.

FIG. 8 illustrates an example method 800 that facilitates a detection of a host policy node based on a transfer of identifier data to a UE, according to an aspect of the subject disclosure. As an example, method 800 can be implemented by one or more network devices of a communication network (e.g., cellular network). At 802, network identifiers can be assigned to core network policy nodes (e.g., PCRF and/or PGW). As an example, the network identifiers can comprise a 16-bit identifier that maps to hostnames of the PCRF and/or PGW. At 804, during default bearer establishment associated with a UE (e.g., when a UE powers on, enters the network coverage area, etc.), identifier data associated with the policy nodes, for example, PCRF and PGW, can be conveyed to the UE via a MME. For example, the PGW can include the identifier data as an IE in a GTPv2-C Create Session Response to the MME, which in turn can send the identifier data to the UE in a NAS Message (e.g., ESM Message Container IE). The identifier data can then be stored and maintained in the UE.

At 806, the identifier data can be received with (e.g., inserted within and/or appended to) an application service request sent from the UE to initiate an application service. For example, the UE can transmit a SIP INVITE message, that comprises the identifier data, to P-CSCF to initiate a VoLTE call. In response to receiving the application service request, at 808, the identifier data can be transferred to a DRA via a diameter request (e.g., Rx AAR message). Further, at 810, based on the identifier data, a PCRF hostname can be retrieved from a mapping table and the diameter request can be relayed to the appropriate PCRF to facilitate an establishment of a dedicated bearer associated with the application service.

In one aspect, the systems 100-600 and methods 700-800 disclosed herein provide various non-limiting advantages, for example, (i) eliminating dependence on a binding database to find the correct PCRF for AF; (ii) improving PCRF detection efficiency; (iii) minimizing service impact to end-user and/or application; (iv) addressing VoLTE and/or other application service resiliency issues without utilizing a DRA binding database; (v) reducing cost and maintenance of DRA upgrade (e.g., since a binding database is not required); (vi) enabling development of new application services; etc.

Figure 9:
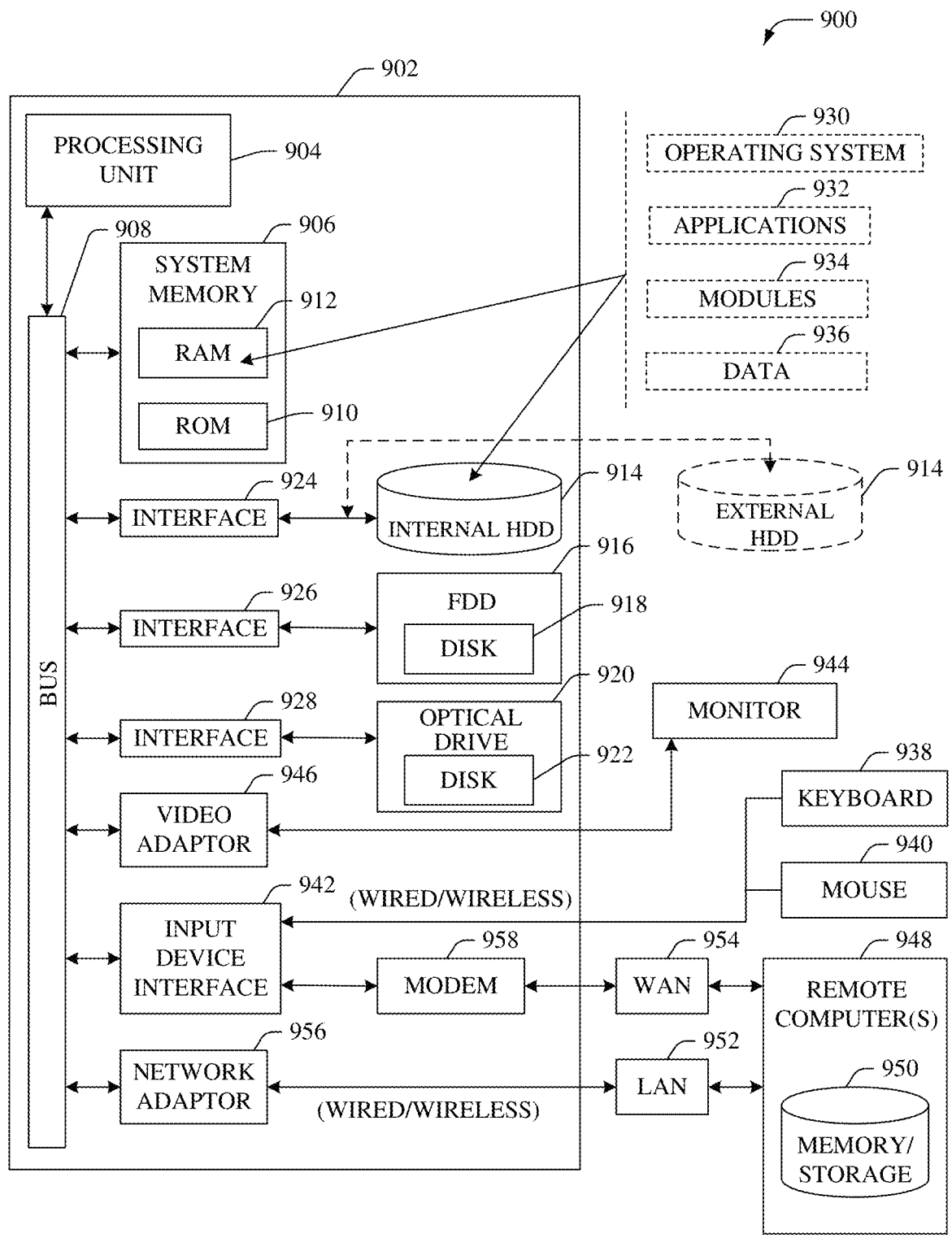
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, applications (e.g., program modules) comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media. Combinations of the any of the above should also be included within the scope of computer-readable media.

With reference again to FIG. 9, the example environment 900 for implementing various aspects of the specification comprises a computer 902, the computer 902 comprising a processing unit 904, a system memory 906 and a system bus 908. As an example, the component(s), application(s) server(s), equipment, system(s), interface(s), gateway(s), controller(s), node(s), entity(ies), function(s), cloud(s), agent(s), entity(ies), and/or device(s) (e.g., DRA 102, PCRF 104, UE 106, devices of network 108, MME 110, S/PGW 112, AF 114, ID determination component 402, ID transmission component 406, ID extraction component 408, PCRF selection component 410, ID configuration component 502, DRAs $602_1$-$602_N$, PCRF/PGW $604_1$-$604_M$, devices of network 606, etc.) disclosed herein with respect to systems 100-500 can each comprise at least a portion of the computer 902. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954 or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
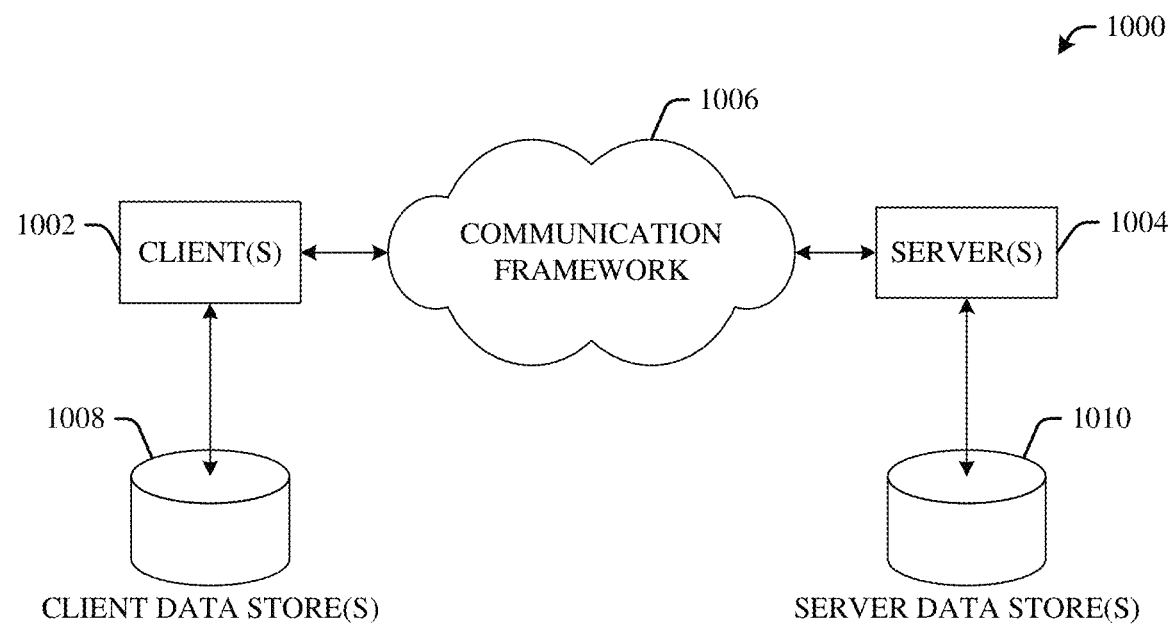
FIG. 10 illustrates a schematic block diagram of a computing environment in accordance with the subject specification.

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:
1. A system, comprising:
a processor; and
a memory that stores executable instructions that, when executed by the processor, facilitate performance of operations, comprising:
receiving, from a user equipment, request data indicative of a request to initiate an application service;
establishing the application service based on identifier data assigned to a group of policy node equipment, wherein the identifier data represents a first identifier assigned to packet data network gateway equipment and a second identifier assigned to policy network equipment of the group of policy node equipment, and wherein the second identifier is returned by the policy network equipment, using a credit control answer message, to the packet data network gateway equipment; and
transferring, to diameter routing agent equipment, message data comprising the identifier data, wherein the message data facilitates determination of the policy node equipment of the group of policy node equipment and the user equipment, and wherein the policy node equipment supplies information used to establish a dedicated bearer associated with the application service.

2. The system of claim 1, wherein the operations further comprise:
establishing a default bearer; and
facilitating, using the default bearer, a transfer of the identifier data to the packet data network gateway equipment, wherein the packet data network gateway equipment services the user equipment.

3. The system of claim 2, wherein the operations further comprise:
forwarding the identifier data from the packet data network gateway equipment to application function equipment.

4. The system of claim 3, wherein the identifier data is forwarded from the packet data network gateway equipment to the application function equipment using out-of-band signaling.

5. The system of claim 3, wherein the operations further comprise:
based on the request data, directing the message data comprising the identifier data from the application function equipment to the diameter routing agent equipment using a diameter request.

6. The system of claim 2, wherein the operations further comprise:
forwarding the identifier data from the packet data network gateway equipment to the user equipment, wherein the identifier data is stored within a data store of the user equipment.

7. The system of claim 6, wherein the request data comprises the identifier data.

8. The system of claim 1, wherein the identifier data comprises address data indicative of an address of the policy node equipment.

9. The system of claim 1, wherein the identifier data comprises hostname data indicative of a hostname of the policy node equipment.

10. The system of claim 1, wherein the identifier data comprises a defined identifier that applies to a pool of the group of policy node equipment that share a common session database.

11. The system of claim 1, wherein the identifier data comprises a defined identifier that maps to a first hostname of packet data network gateway equipment and to a second hostname of policy and charging rules function equipment.

12. A method, comprising:
determining, by a system comprising a processor, that a default bearer has been established for a user equipment;
receiving, by the system, identifier data indicative of a group of policy equipment used to establish an application service, wherein the identifier data comprises a first identifier assigned to gateway equipment and a second identifier assigned to policy equipment of the group of policy equipment, and wherein the second identifier is returned, in a credit control answer message, by the policy equipment to the gateway equipment; and
receiving, from the user equipment, request data indicative of a request to initiate the application service, supplying, by the system, message data to a diameter routing agent, wherein the message data comprises the identifier data that is used to determine the policy equipment, and facilitating a transfer of the message data to the policy equipment that provides information that is utilized to establish a dedicated bearer associated with the application service.

13. The method of claim 12, further comprising:
storing, by the system, the identifier data, within a data store of the user equipment.

14. The method of claim 12, further comprising:
storing, by the system, the identifier data, within a data store of an application function device associated with the policy equipment and the gateway equipment.

15. A non-transitory machine-readable medium, comprising executable instructions that, when executed by a processor of a user equipment, facilitate performance of operations, comprising:
determining that an application service is to be initiated based on request data, wherein the request data comprises identifier data representing a group of policy equipment, wherein the group of policy equipment is associated with establishing a default bearer for the user equipment, wherein the identifier data represents a first identifier assigned to packet gateway equipment and a second identifier assigned to policy equipment of the group of policy equipment, and wherein the second identifier is returned, in credit control data, from the policy equipment to the packet gateway equipment; and
directing the request data to application equipment, wherein the directing facilitates a transfer of message data to the group of policy equipment to facilitate an establishment of a dedicated bearer for the application service.

16. The non-transitory machine-readable medium of claim 15, wherein the identifier data comprises a defined identifier that maps to a first hostname of the packet gateway equipment and to a second hostname of the policy equipment.

17. The non-transitory machine-readable medium of claim 15, wherein the request data is transferred to diameter routing equipment, and wherein the identifier data is used to determine hostname data associated with the policy equipment to which the request data is to be relayed.

18. The non-transitory machine-readable medium of claim 17, wherein the hostname data is determined based on information stored within a mapping table of the diameter routing equipment.

19. The non-transitory machine-readable medium of claim 15, wherein the application service comprises a voice over long term evolution call.

20. The non-transitory machine-readable medium of claim 15, wherein the directing facilitates the transfer of the message data to the group of policy equipment independent of employing a binding database.

* * * * *